United States Patent [19]

Weber et al.

[11] Patent Number: 4,916,014

[45] Date of Patent: Apr. 10, 1990

[54] I.R. REFLECTING PAINT

[76] Inventors: Paul Weber, 358B Saybrook La., Wallingford, Pa. 19086; Michael R. Weber, 22 Seneca Rd., Ft. Lauderdale, Fla. 33308

[21] Appl. No.: 115,154

[22] Filed: Oct. 30, 1987

[51] Int. Cl.[4] .................. B32B 15/00; B32B 17/00; B32B 19/00
[52] U.S. Cl. ................................ 428/403; 428/404; 428/406; 428/407
[58] Field of Search ............ 428/403, 406, 407, 363, 428/404; 427/212; 106/308 F; 523/135, 136, 137, 171, 210, 216, 217

[56] References Cited

U.S. PATENT DOCUMENTS 4,131,593 12/1978 Mar et al. ........................ 524/780

FOREIGN PATENT DOCUMENTS

| 0065751 | 4/1982 | Japan | 523/137 |
| 0086638 | 5/1984 | Japan | 523/200 |
| 0258875 | 11/1986 | Japan | 523/137 |

*Primary Examiner*—William J. Van Balen
*Attorney, Agent, or Firm*—John Lezdey

[57] ABSTRACT

A paint for structures comprising infrared reflecting particles of a metal oxide or noble metal on a substrate comprising a plastic or mica.

8 Claims, No Drawings

I.R. REFLECTING PAINT

FIELD OF THE INVENTION

This invention relates to coatings for structures exposed to the atmosphere, particularly sunlight, for example buildings, ships and vehicles, and for construction materials which are to be used at the exterior of such structures, and compositions therefor.

More particularly, there is provided a process and a paint composition for reflecting infrared radiation from a building structure.

BACKGROUND OF THE INVENTION

Paints are applied to buildings and other structures exposed to the atmosphere in order to give protection against the weather and for decorative effect. Paints are not usually used in connection with radiation except for camouflage.

U.S. patent application Ser. No. 226,787 filed Jan. 21, 1981 relates to a camouflage material effective in the spectral range from visible light to radar waves having in sequence a fabric texture base, a soft plastic coating on the base, a metallic layer adhering to the plastic coating and a paint layer thereon wherein the metallic layer and paint layer in combination have an emission factor in the 3 to 5 $\mu$m spectral region of between 30 to 70% and in the 8 to 14 $\mu$m spectral region of between 40 to 85%.

U.S. application Ser. No. 495,354 filed Dec. 6, 1982 discloses a camouflage material of the above type comprising a base layer coated with a reflective conductive layer containing aluminum, copper or zinc which is reflective in the range of terrestrial thermal radiation and in the radar region of the spectrum and has a surface resistivity of not more than 0.5 to 10 ohms per square. This reflective layer is coated with a camouflage paint having reflective properties in the visible and near IR spectral regions similar to the natural warm background and incorporated in a binder having good transparency in windows II and III (3 to 5 $\mu$m and 8 to 14 $\mu$m, respectively). This reduces the emission contrast.

British Patent No. 1,605,131, published Dec. 6, 1981, discloses a camouflage object comprising a body having a surface which is highly reflective in the spectral ranges 3 to 5 $\mu$m (window II) and 8 to 14 $\mu$m (window III) and a coating of a camouflage paint on the highly reflecting surface. The paint contains a pigment having camouflage properties in the visible and near IR range and a binding agent and has an emissivity less than 90% in the spectral range of 3 to 5 $\mu$m and 8 to 14 $\mu$m. The emission power in windows II and III is "structure" by applying a priming paint comprising colors which are highly reflecting, in the manner of a clean metal surface, alternating with colors having a black effect in the longwave IR range. "Structuring" may also be obtained by using a priming paint which is highly reflective and using a camouflage paint comprising pigments having different absorbing and/or scattering properties. A third method of "structuring" is obtained by using a primary paint which is highly reflecting and a camouflage paint with uniform pigmentation applied with locally different thicknesses. The binding agent suitably has a high absorption in the range from 5.5 to 7.5 $\mu$m.

Infrared reflectors are compounds which reflect infrared energy. Infrared reflecting films have been used to coat windows in high energy laser systems (see, *"Infrared Coatings for High Energy Laser Reflectors and Windows"*, Morris Braunstein, SPIE, Vol. 140, Optical Coatings-Applications and Utilization II, pp. 85–94 (1978). They have also been used to construct transparent heat mirrors for architectural glass coatings, light bulb envelopes, protective lenses, solar heat devices and the like. (See, *"Materials for Transparent Heat Mirror Coatings"*, G. Haacke, SPIE, Vol. 324, Optical Coatings for Energy Efficiency and Solar Applications, pp. 10–15 (1982).

SUMMARY OF THE INVENTION

The present invention is directed to an infrared reflecting composition for coatings for structures exposed to sunlight which reduce heating of the structure by the heating rays of the sun. In accordance with the invention, the structures are provided with at least one outer coating comprising an infrared reflecting effective amount of particles of an infrared reflecting material in combination with a an inert transparent non-infrared absorbing substrate. The present invention is also directed to methods of reflecting infrared radiation away from the structure by applying said compositions containing infrared reflecting material and substrate to the structure.

The substrates employed in the present invention are, preferably, substantially transparent or reflect light in a manner which approximates the color of the paint composition or coating composition in which they are employed. The infrared reflecting materials are utilized in combination with a substrate such as fine particles of mica, glass, non-infrared absorbing silicates and the like, high molecular weight solid hydrocarbons or a plastic material, for example, polymethacrylate, polyethylene terephthalate, and the like. The particle size of the substrate should be sufficiently small so as to enable the coated particle to be easily and evenly distributed throughout the paint composition. The preferred particle size of the substrate is within the range of from about 20 microns to about 2 millimeters. Mica is the preferred substrate for use in the present invention.

The fine particles of the substrate are coated with at least one layer comprising an infrared reflecting amount of an infrared reflecting material. The infrared reflecting materials are preferably substantially transparent or reflect light in a manner which approximates the color of the composition in which they are incorporated. Under these circumstances, the present infrared reflecting material composition is substantially invisible or at least barely noticeable when applied to the structure. The infrared reflecting materials particularly suited for the present invention include metals from Groups IB, IIb, IIA, IVA, VIIB and VIIIB of the Periodic Table.

The infrared reflecting metal is coated on the substrate to a thickness sufficient to insure a suitable degree of infrared reflectance. For most applications including protection from infrared radiation generated by the sun, it is preferred to coat the substrate with the metal to a thickness in the range of from about 10,000 to 50,000 Å.

The metals which are preferably employed as infrared reflectors in the present invention include the noble metals (e.g., gold, silver, platinum, etc.), zinc, nickel, copper and aluminum. In a preferred embodiment of the invention, the metal may be coated on each of its sides with a dielectrical material such as titanium dioxide or zinc sulfide or combinations thereof to contain an infrared reflecting composition which has improved visible transparency and enhanced infrared reflectivity.

The thickness of the metal containing infrared reflecting coating is preferably in the range of from about 100 to about 300 A.

The infrared reflecting compositions may be produced by applying a coating of the infrared reflecting material on the fine particles of the substrate by conventional methods such as chemical vapor deposition, evaporation, sputtering, spray pyrolysis and the like. Alternatively, the substrate may be coated as a sheet and then the coated sheet ground into fine particles.

The coated substrates may be added to conventional coating compositions such as paints and pastes and then applied to structures which are exposed to infrared radiation.

The film-forming binder for the top-coat paint of the invention can in general be any of those used in the paint industry, for example, an alkyd resin (including modified alkyds), an epoxy resin (including epoxy esters), an oleoresin, a chlorinated rubber, a vinyl resin, a polyurethane, a polyester, an organic or inorganic silicate, a polyamide, or an acrylic polymer. Two or more compatible film-forming organic polymers can be used in the paint. An extender resin such as a hydrocarbon resin can be present. A plasticiser for the binder resin, for example a chlorinated paraffin or a low molecular weight resin such as an acrylic resin or a polybutene, may be used. A preferred binder for a masonry paint is, for example, an acrylic polymer such as a copolymer of one or more alkyl acrylates and methacrylates, preferably a styrene/acrylic copolymer containing 25–70% of acrylic ester units and 25–70% of styrene units. Top coat paints for use over a primer on metallic structures can, for example, use an acrylic binder, preferably a styrene/acrylic copolymer or an alkyd resin. The use of a plasticizer is preferred with such copolymers.

The structure or construction material may, for example, be of brick, concrete, plaster, plastics, wood, fibre board or metal, provided that in the case of metal the surface to be coated has previously been coated. Such surfaces may collectively be referred to as non-metallic surfaces. By a "top-coat paint" is meant a paint which is intended to be exposed in use, that is it is not to be over-coated. When the paint is applied to masonry such as brick or concrete it may be the only coating applied to the masonry, whereas when it is applied to metal it is applied over a primer. Such a primer is generally one containing a pigment.

The infrared reflecting material volume concentration of the coating composition is preferably at least 10 percent, more preferably at least 25 percent.

The following examples are for illustrative purposes only and are not meant to limit the invention as set forth in the claims forming a part of the application.

EXAMPLE 1

Preparation of A Sandwich Film of Titanium Dioxide (Dielectric) and Gold

A sheet of mica is ultrasonically cleaned in a heated decontamination solution (DECONTAM sold by Electronic Space Products, Inc., Los Angeles, Calif.), rinsed in deionized water and blown dry in nitrogen gas.

A $TiO_2$ target is presputtered at 1.6 W/cm$^2$ in an Argon-oxygen mixture (10 vol % Oxygen) for 15 minutes, then in Argon for 15 minutes. The flow rates of the Argon-Oxygen mixture and Argon are kept at about 74 cm$^3$/min. The sputtering pressure is $7-10 \times 10^{-3}$ Torr.

A $TiO_2$ film having a thickness of about 180 A is deposited on the sheet of mica by sputtering at 0.8 W/cm$^2$ for 7.5 minutes in Argon at a flow rate of about 74 cm$^3$/min at the same sputtering pressure employed above.

A film of gold approximately 180 A thick is deposited by sputtering at 0.4 W/cm$^2$ for 35 seconds in Argon and the same flow rate and sputtering pressure described above for depositing the $TiO_2$ film.

Another $TiO_2$ film is deposited on the gold film in the same manner as described above for the deposition of the initial $TiO_2$ film. The resulting product reflects at least about 75% infrared radiation in the near IR region (750–1000 nm) and approaches 100% reflectance at about 3,000 nanometers.

EXAMPLE 2

Gold Coated Mica

A piece of gold wire 19.2 mm long and 0.2 mm wide weighing about 8 mg was twisted around a tungsten filament secured within a Denton Vacuum Machine Model No. DV-502. The filament was connected to two electrodes and a petri dish containing fine particles of mica (e.g., 20 microns to 2 millimeters) was placed about 5 to 7.5 cm below the filament.

The gold wire was heated and subsequently evaporated onto the mica particles at a vacuum pressure of $10^{-5}$ Torr at 20 amps and 45 volts for 3 seconds.

EXAMPLE 3

A white paint having a pigment volume concentration of 50 percent and suitable for use on masonry was prepared by ball-milling the following ingredients until the particle size was about 40 microns.

|  | Percent by Weight |
| --- | --- |
| 'Pliolite AC-4' styrene acrylic copolymer | 7.8 |
| 'Cereclor' chlorinated paraffin plasticiser | 7.8 |
| Finely ground gold Coated Mica of Example 1 | 18.3 |
| Titanium dioxide | 16.1 |
| Calcium carbonate | 8.3 |
| Mica | 2.1 |
| Diatomaceous earth | 2.2 |
| Zinc Oxide | 0.9 |
| Bentonite | 0.4 |
| White spirit solvent | 27.4 |
| Xylene solvent | 8.7 |

If desired, the solvent may be reduced to prepare a paste-coating composition. In lieu of gold there may be utilized copper, tin, aluminum, or any other infrared reflecting metal.

EXAMPLE 4

A masonry paint was prepared having the composition described in Example 3 but containing only 16.3 percent of the finely ground gold coated mica of Example 3 and 2.0 percent sodium zinc molybdate.

EXAMPLE 5

Top-coat paints having a pigment volume concentration of about 40 percent and suitable for use on the upper parts of ships were prepared using the formulations of Examples 3 and 4 respectively with the omission of the calcium carbonate.

The paints had the same good heat reflecting property as the paint of Example 3.

While this invention has been illustrated and described in connection with certain preferred embodiments thereof, it will be apparent to those skilled in the art that the invention is not limited thereto. Accordingly, it is intended that the appended claims cover all modifications which are within the spirit and scope of the invention.

What is claimed is:

1. In a paint composition having a film forming binder the improvement which comprises incorporating into said paint composition particles of a substrate with a layer of an infrared reflecting metal, said metal being coated with a dielectric material, said particles being present in an amount effective for reflecting infrared radiation when applied to a structure.

2. The paint of claim 1 wherein the dielectric material is selected from titanium dioxide and zinc sulfide.

3. The paint of claim 1 wherein the metal is a noble metal.

4. The paint of claim 1 where said substrate is selected from the group consisting of mica, glass, non-infrared absorbing silicate, high molecular weight solid hydrocarbon and plastic material.

5. The paint of claim 1 wherein the substrate has a particle size in the range of from about 20 microns to about 2 millimeters.

6. The paint of claim 4 wherein said substrate is a non-infrared absorbing silicate.

7. The paint of claim 4 wherein said substrate is mica.

8. The paint of claim 4 wherein said substrate is glass.

* * * * *